United States Patent [19]

Waldner

[11] Patent Number: 4,681,004

[45] Date of Patent: Jul. 21, 1987

[54] APPARATUS AND METHOD FOR FORMING DIE-CUT ARTICLES FROM SHEET MATERIAL

[76] Inventor: Kurt Waldner, 12260 Saraglen Dr., Saratoga, Calif. 95170

[21] Appl. No.: 656,612

[22] Filed: Oct. 1, 1984

[51] Int. Cl.⁴ .............................................. B26D 7/18
[52] U.S. Cl. ......................................... 83/98; 83/71; 83/165; 83/245; 83/575; 83/698
[58] Field of Search ................ 83/55, 71, 24, 93, 94, 83/98, 99, 165, 111, 698–700, 245, 221, 649, 684–691, 575, 589, 365

[56] References Cited

U.S. PATENT DOCUMENTS

| | | | |
|---|---|---|---|
| 2,579,940 | 12/1951 | Lobrovich | 83/98 X |
| 3,664,220 | 5/1972 | Blair | 83/245 X |
| 3,668,958 | 6/1972 | Kinsey | 83/94 X |
| 3,695,130 | 10/1972 | Fedrigo | 83/575 X |
| 3,796,117 | 3/1974 | Mukai et al. | 83/365 X |
| 3,872,786 | 3/1975 | Holton | 83/98 X |
| 3,982,458 | 9/1976 | Terasaka | 83/698 X |

*Primary Examiner*—James M. Meister
*Assistant Examiner*—John L. Knoble
*Attorney, Agent, or Firm*—Townsend and Townsend

[57] ABSTRACT

Apparatus and method for forming disks or other articles from flexible sheet material. The disks can be used, for example, as substrates of magnetic recording disks known as floppy disks. The apparatus includes an upper die plate shiftably mounted above a lower die plate and having a die thereon so that a strip of material moveable between the die plates can be sequentially die-cut to form the disks. The upper die plate has quick release latches attaching the upper die plate to a support so that, when the latches are retracted, the upper die plate can be quickly and easily removed from the apparatus to permit the die to be sharpened or replaced. The apparatus includes air delivery ports near the upper and lower die plates to direct air under pressure against a disk after it has been die-cut from the strip so that the disk will be moved laterally and into a chute and onto a spindle which receives a stack of the disks. The strip is incrementally unwound from a roll and forms a low-tension loop near the entry point between the upper and lower die plates. The loop is controlled by an electric eye device which senses the presence or absence of the loop. A pair of adjacent pressure rollers receive and frictionally engage the strip near the opposite end of the apparatus to incrementally pull the strip past the die plate. A timing device controls the advancement of the strip, the lowering of the upper die plate, and the blowing of air against the disks after they are die-cut.

12 Claims, 9 Drawing Figures

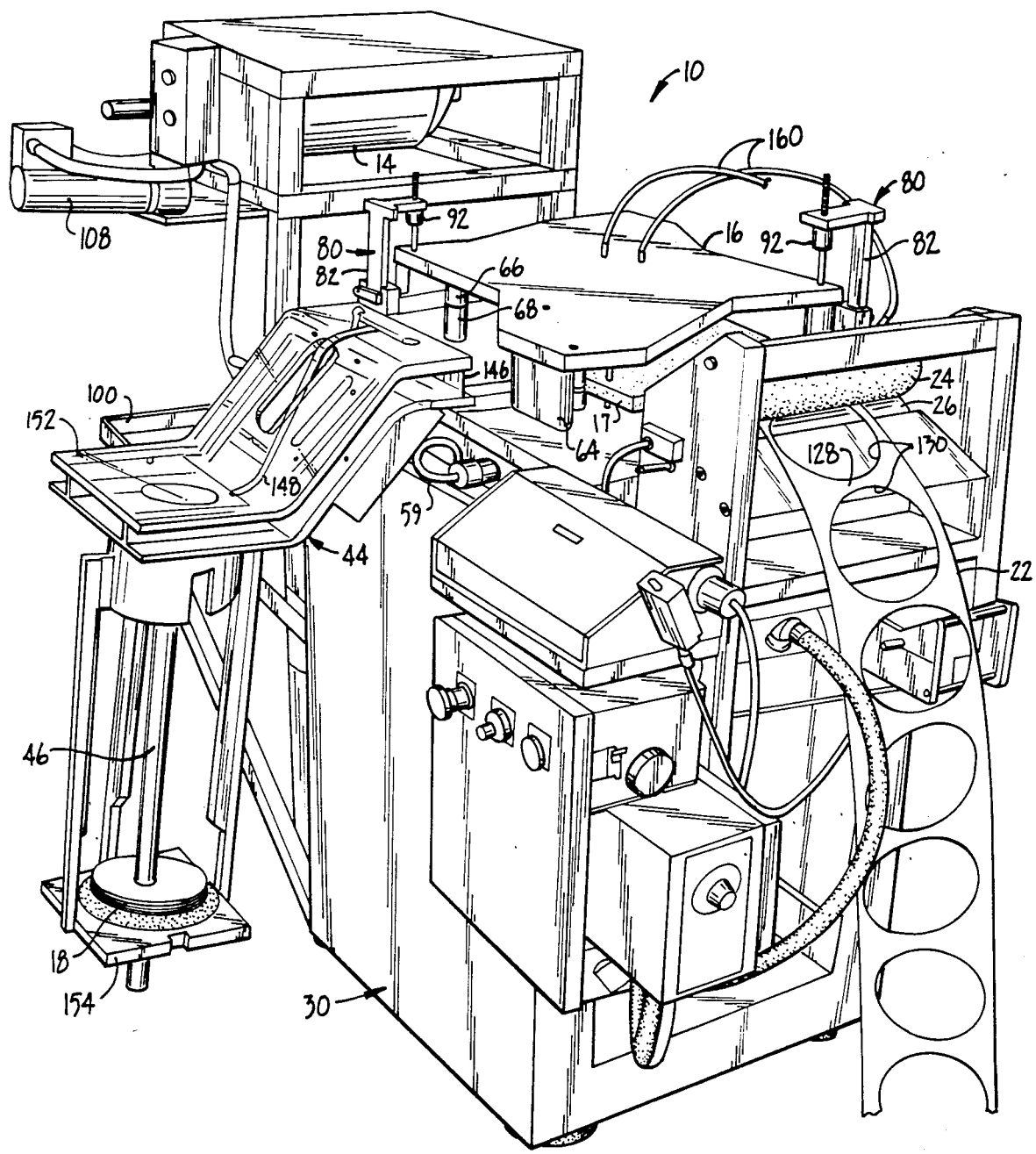
FIG._1a.

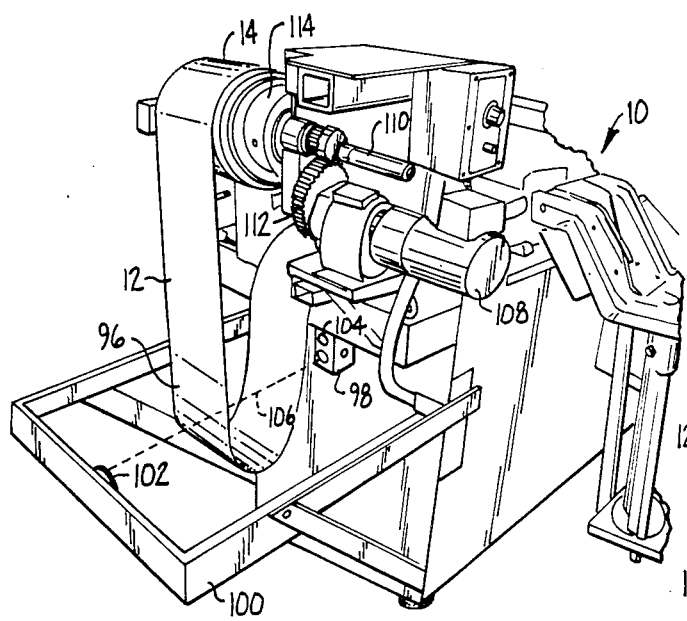
FIG._1b.
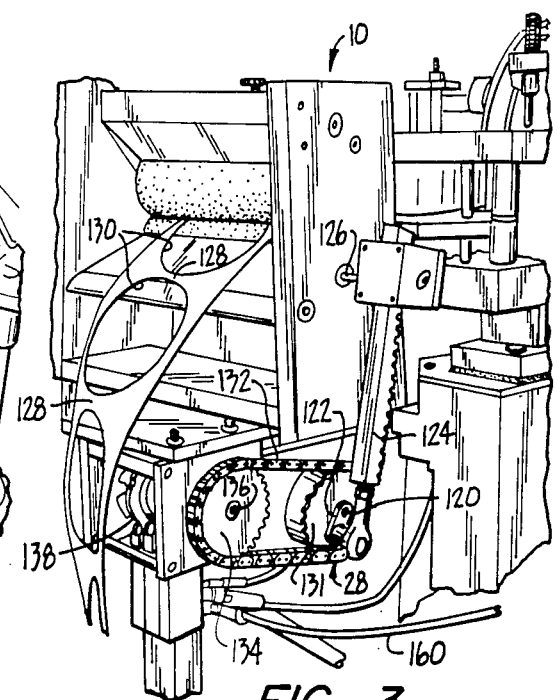
FIG._3.
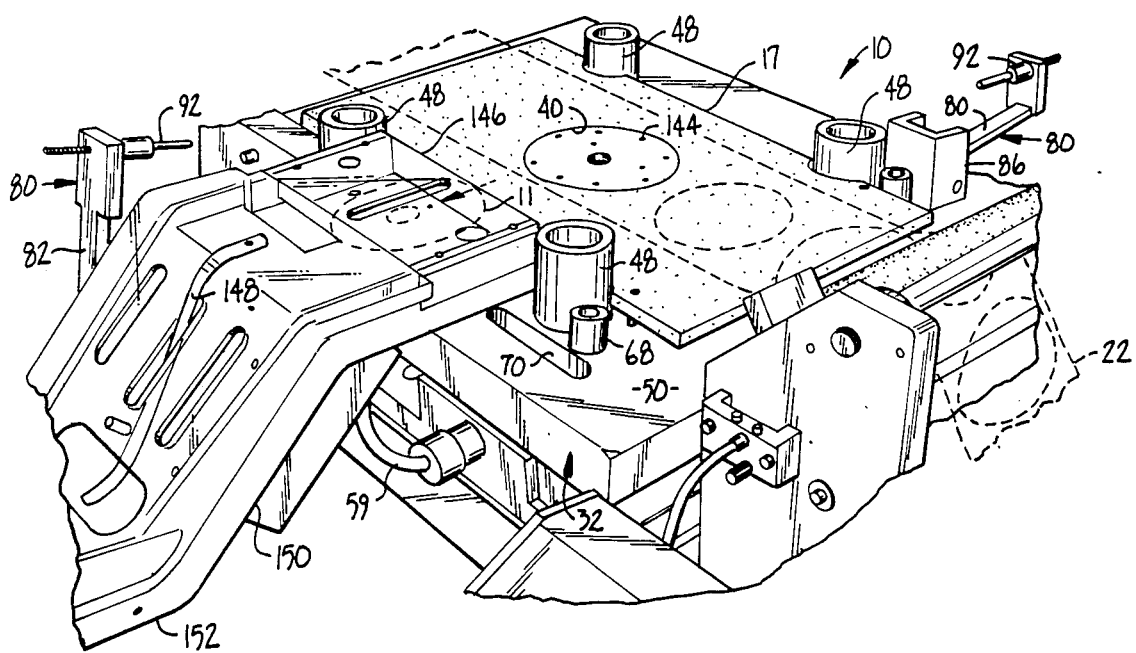
FIG._2.

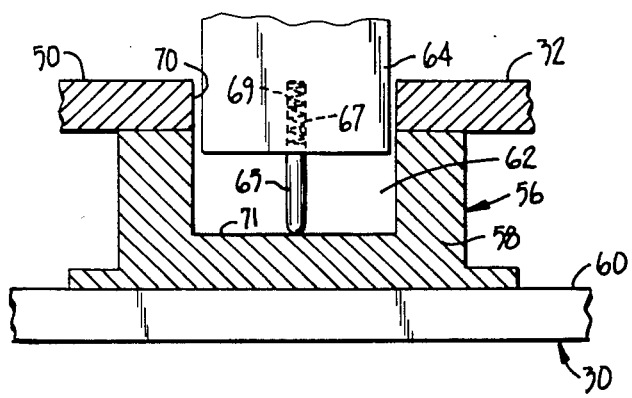
FIG._2a.
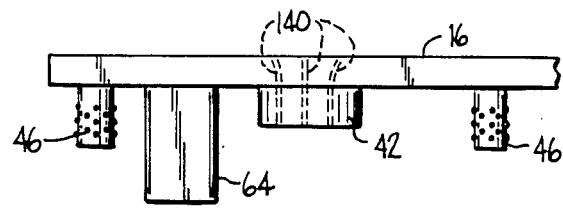
FIG._6.

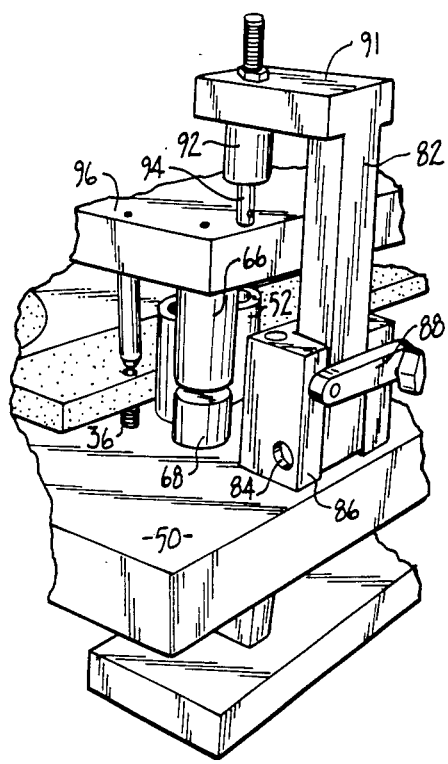
FIG._4a.
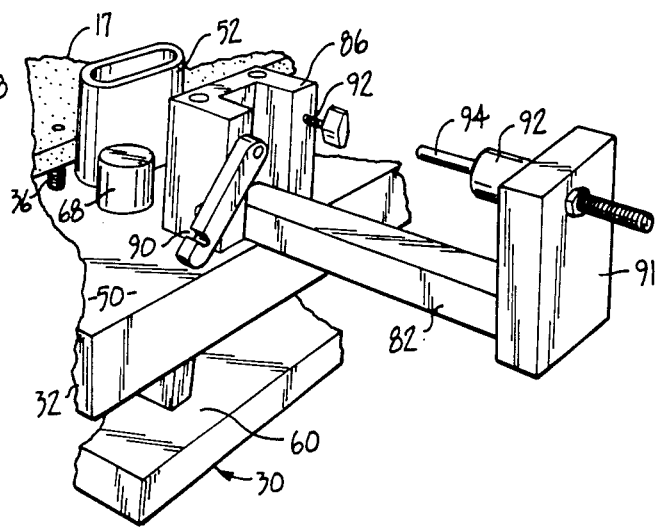
FIG._4b.
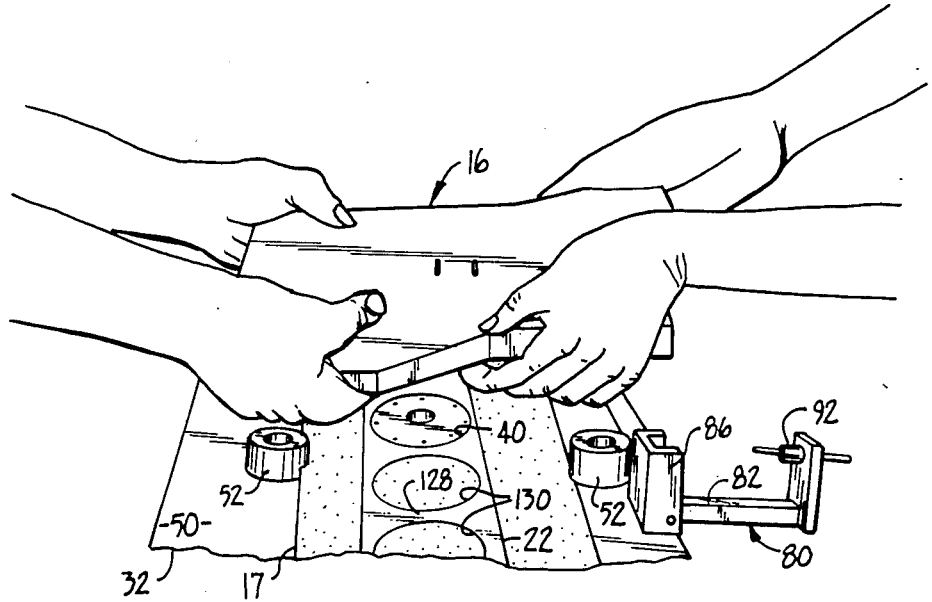
FIG._5.

APPARATUS AND METHOD FOR FORMING DIE-CUT ARTICLES FROM SHEET MATERIAL

This invention relates to improvements in the formation of die-cut articles from sheet material and, more particularly, to apparatus and method for die-cutting disks which can be used to make floppy disks for magnetic recording purposes.

BACKGROUND OF THE INVENTION

Die cutting of flexible sheet material has been known and used in the past for forming substrates for use as floppy disks for magnetic recording purposes. Typically, conventional apparatus for accomplishing this purpose is extremely complex in construction, requires a large amount of space, is noisy in operation and requires hydraulic or air pressure to close the dies in die-cutting of the material. Moreover, the complexity of such conventional apparatus requires a workman to expend a great amount of time and effort to disassemble the apparatus to gain access to the dies for sharpening or replacement. A large capital equipment expenditure is required when using conventional die-cutting apparatus; thus, economies cannot be realized when using such equipment, thereby keeping the production costs of such disks relatively high.

Because of the foregoing drawbacks, a need exists for improvements in apparatus and a method of die-cutting such disks to minimize their production while assuring high reliability of the die-cutting apparatus. The present invention satisfies this particular need.

SUMMARY OF THE INVENTION

The present invention is directed to apparatus and a method for die-cutting of disks, one by one, from a strip of sheet material, such as Mylar, whereby the disks can be reliably die-cut in a minimum of time and with a minimum expenditure for equipment. Thus, production costs of such disks can be greatly minimized over conventional production techniques, and capital equipment costs are much lower than those associated with conventional apparatus.

The apparatus of the present invention is relatively small in overall size; thus, it requires a minimum of space yet it is able to have a high through-put of material so that a large number of disks can be die-cut in a minimum of time. Moreover, the die for die-cutting the strip into disks is operated by a magnetic power means which operates much more quietly than the hydraulic or pneumatic power means used in conventional equipment. Also, the magnetic power means of the present invention does not require the complex structural components of conventional apparatus and can be operated economically with low power requirements.

Another aspect of the present invention is the way in which the die plate carrying the die which die-cuts the strip forms a part of the apparatus. Such die plate is easily mounted on and removed from the apparatus by the use of shiftable latches which move into and out of operative positions holding the die plate coupled to the apparatus. When the latches are retracted, the die plate can be quickly and easily lifted off the apparatus to allow immediate access to the die carried by the die plate so that the die can be either sharpened or replaced as necessary, all of which can be done in a matter of seconds rather than the much longer time required for the time-consuming task of disassembling a conventional apparatus to gain access to the die thereof.

The primary object of the present invention is to provide an apparatus and method for die-cutting of articles from sheet material as the sheet material is incrementally advanced past and between a pair of relatively shiftable die plates, whereby the articles can be quickly and easily die-cut in a minimum of time and with minimum power, yet the die-cutting operation is highly reliable, requires a minimum amount of space, and is less noisy than conventional apparatus, all of which contributes to a high yield at low production costs.

Other objects of this invention will become apparent as the following specification progresses, reference being had to the accompanying drawings for an illustration of the invention.

IN THE DRAWINGS

FIG. 1a is a perspective view of the apparatus for forming die-cut articles from sheet material, looking at the front end of the apparatus;

FIG. 1b is a view similar to FIG. 1a but on a smaller scale and looking forwardly from the rear of the apparatus;

FIG. 2 is an enlarged, fragmentary perspective view of the top portion of the apparatus;

FIG. 2a is a fragmentary, cross sectional view of the magnetic power means for shifting an upper die plate relative to a lower die plate;

FIG. 3 is a fragmentary, perspective view of the apparatus looking at one side of the machine and toward the front end thereof;

FIG. 4a is an enlarged, fragmentary perspective view of the latch mechanism for removably holding the upper die plate on the apparatus;

FIG. 4b is a view similar to FIG. 4a but showing the latch open and the upper die plate removed from the apparatus;

FIG. 5 is a perspective view, looking in the direction from front to rear of the apparatus, showing the way in which the upper die plate can be removed from the apparatus when the latches are open; and FIG. 6 is a schematic, side elevational view of the upper die plate.

The apparatus of the present invention is broadly denoted by the numeral 10 and is adapted, for purposes of illustration, to die-cut or stamp disks 11 of material from a material strip 12 as the strip advances from a roll 14 (FIG. 1b) through the apparatus, past and beneath an upper die plate 16 which cooperates with a lower die plate 17 to stamp the disks one by one from the strip and then allow the disks to advance laterally into a stack 18 (FIG. 1a). Again, for purposes of illustration, the disks are formed from Mylar which can be coated on opposite sides to form a floppy disk for magnetic recording purposes using conventional disk drive assemblies. The strip 12, after being stamped or die-cut to form the disks, moves out of apparatus 10 at the front end 20 thereof (FIG. 1a) as a spent segment 22 which typically is discarded as scrap. The strip is advanced past the upper die plate 16 by the incremental rotation of a pair of pressure rollers 24 and 26 (FIGS. 1a and 3), which are operated under the influence of a rotary drive means 28 at one side of the apparatus as shown in FIG. 3.

Apparatus 10 includes a table-like support 30 which is adapted to rest on the floor and to extend upwardly to a height of approximately 3½ to 4 feet above the floor.

At the upper end of the support is a base plate 32 on which lower die plate 17 is mounted. The lower die plate 17 is supported on a number of coil springs 36 (FIGS. 4a and 4b) so that the lower die plate can shift vertically downwardly through a small distance when it is contacted by the die on the lower surface of upper die plate 16 during a downward stroke of the upper die plate 16.

Lower die plate 17 has a circular recess 40 which is shallow in depth but which allows the circular die 42 (FIG. 6) on the lower surface of upper die plate 16 (FIG. 6) to be received in recess 40 as the upper die plate 16 moves downwardly under the influence of a drive means as hereinafter described. As die 42 engages the strip 12 overlying recess 40, the strip is die-cut to form a disk 11 of the same diameter as the diameter of recess 40. The disk is then shifted laterally by air pressure so that the disk will follow a laterally and downwardly extending path into a chute 44, onto a spindle or shaft 46, and onto the upper disk of stack 18 (FIG. 1a). Chute 44 will be described hereinafter.

Upper die plate 16 has a number of spaced follower members 46 thereon and projecting downwardly therefrom (FIG. 6). These follower members have ball bearings on the outer surface thereof and are shiftably received within respective cylindrical, open top guides 48 (FIG. 2) which are rigid to and extend upwardly from the upper surface 50 of base plate 32 (FIG. 2). Guides 52 allow die plate 16 to move downwardly under the influence of power means hereinafter described so that die 42 will properly die-cut strip 12 to form a disk 11.

Power means 56 (FIG. 2a) is provided to cause downward movement of upper die plate 16 upon receipt of a signal from a timing means hereinafter described. Power means 56 includes a tubular member 58 carried on the upper surface plate 60 of support 30. Member 58 has a coil which surrounds a central hollow space 62 into and out of which a core or armature 64 is vertically movable. Core 64 is secured to and depends from the lower surface of upper plate 16 as shown in FIG. 6. The core is partially in space 62 when upper die plate 16 is in its elevated position. When a signal is received by coil 58 by way of a cable 59 (FIG. 2), a magnetic force is generated in space 62 in a direction to pull core 64 and thereby die plate 16 downwardly through a limited distance as determined by a stop 66 on die plate 16 which engages a stub shaft 68 projecting upwardly from the upper surface 50 of base plate 32 (FIG. 4a). When stop 66 engages stub shaft 68, the die 42 will have die-cut strip 12 to form a disk 11, whereupon the signal is removed from coil member 58 and the magnetic force is removed, thereby allowing upper die plate 16 to return to its elevated position once again.

Core 64 has a bias means thereon which biases the core and thereby upper die plate 16 upwardly. This bias means includes a rigid rod 65 shiftably received in a bore 67 at the bottom of core 64. A coil spring in bore 67 above rod 65 engages the rod and biases it downwardly. The lower end of the rod normally engages the bottom inner surface 71 of tubular member 58. When the die plate 16 is moved downwardly, rod 65 compresses spring 69 since the magnetic downward force on core 64 is greater than the bias force of spring 69. When the magnetic force is removed after a die-cutting operation, spring 69 expands to raise the upper die plate 16 and to return it to its initial operating position.

There may be more than one power means 56, if desired. Typically, there will be a power means 56 at each of a pair of diagonal corners, respectively, of base plate 32. Moreover, coil member 52 is below the base plate as shown in FIG. 2a and the base plate has a slot 70 for shiftably receiving a respective core 64 on die plate 16 thereabove.

Upper die plate 16 can be quickly and easily disconnected from apparatus 10 if desired. To this end, the upper die plate is retained by a pair of latches 80 (FIG. 1a) and these latches swing away from their operative positions shown in FIG. 4a to retracted positions shown in FIG. 4b, allowing the upper die plate 16 to be lifted in the manner shown in FIG. 5 by two workmen on opposite sides of apparatus 10. In this way, the die plate can be quickly and easily separated from the apparatus if it is desired to sharpen die 42 thereon or if die 42 is to be replaced for any reason.

Each latch 80 includes an upright post 82 (FIGS. 4a and 4b) which is hingedly mounted by a pin 84 on a C-shaped bracket 86 rigid to and extending upwardly from the upper surface 50 of base plate 32. When post 82 is in its vertical position, it is held within the recess of bracket 86 by a swingable gate 88 which has a notch 90 (FIG. 4b) which receives a pin 92 on bracket 86, thereby holding the gate in its closed position as shown in FIG. 4a.

Post 82 has a rigid extension 90 at the upper end thereof, extension 90 projecting laterally from post 82 in partially overlying relationship to the upper die plate 16. A damper or shock absorber 92 is adjustably coupled to the outer end of extension 90 and has a vertical piston rod 94 which normally bears against the upper surface 96 of upper die plate 16 to provide a slight downward bias force on the die plate. The purpose of shock absorber 92 is to eliminate the bounce or vibration of upper die plate 16 when it returns to its elevated position following a die-cutting operation. This bounce would ordinarily be caused by the spring 69 in each power means 56 (FIG. 2a). The shock absorber damps out all such vibration so that the die plate is immediately ready for the next downward stroke as the die plate reaches its uppermost equilibrium position.

By swinging the latches 80 into the retracted positions shown in FIG. 4b, the die plate is free to be elevated away from lower die plate 17 in a matter of seconds. This thereby avoids having to disassemble connecting bolts and other structure which would require a large expenditure of time and effort on the part of one or more workmen.

Strip 12, when fed off of roll 14, forms a loop 96 as shown in FIG. 1b. The purpose of the loop is to avoid applying too much tension to the strip as it is fed into the die-cutting zone when a pull is exerted by pressure rollers 24 and 26 in a forward direction on strip 12 (FIG. 3). Without the loop, the strip may be be under too much tension which would cause the strip to break or to become weakened, thereby rendering the strip defective for the purpose of forming disks 11.

To assure that loop 96 is maintained in the strip, an electric eye device 98 is provided, the device being mounted near one end of a frame 100 having a reflector 102 thereon which reflects light from a light source in device 98 into a sensor 104. If the light beam 106 from the light source is broken, the loop is properly in place. If the light beam is reflected into sensor 104, the loop is above the light beam and device 98 will disable the system to shut it down until the loop is again put into place blocking the light beam 106.

A power motor 108 is carried by support 30 and rotates a shaft 110 by gears 112 to rotate the arbor 114 on shaft 110, the arbor being the structure on which roll 14 of strip 12 is wound. Motor 108 is incremented in accordance with timing means hereinafter described to rotate arbor 114 incrementally to thereby advance the strip and to maintain the loop in the strip as shown in FIG. 1b.

The pressure rollers 24 and 26 are rotatably mounted on support 30 with roller 24 above roller 26 and in substantial engagement therewith. Lower roller 26 is rotated by virtue of its connection to a drive motor (not shown) coupled to a shaft 120 (FIG. 3) adjustably coupled by a bracket 122 to the lower end of a rack 124 coupled to a worm (not shown) on one end of a shaft 126, the shaft 126 being coupled to roller 26 to rotate the same. Shaft 120, when rotated under the influence of the motor connected thereto, causes rack 124 to elevate and lower and thereby rotate shaft 126 and roller 26 through a predetermined arc governed by the adjustment of bracket 122. Thus, the amount by which strip 12 is advanced can be controlled by power means 28. This control is provided to control the gap 128 between adjacent die-cuts 130 (FIG. 3). By minimizing the gap 128, a greater number of disks 11 per unit length of strip 12 can be die-cut from strip 12, thereby providing a greater yield and a more profitable operation of apparatus 10. By widening the gap 128 due to control of the stroke of rack 124, a lesser number of disks are cut per unit length of strip 12.

A gear 130 is mounted on shaft 120 and is coupled by a chain 132 to a second gear 134 coupled to a shaft 136 having a number of timing cams 138 which operate fluid valves and electrical switches to sequentially control the operation of apparatus 10. Thus, the timing cams 138 define a timing means which supplies power and air pressure to the various components of apparatus 10 to cause operation of the apparatus in a controlled, sequential manner.

An example of the control provided by timing means defined by the rotatable cams 138 is the flow of air to die 42 (FIG. 4) and to recess 40 (FIG. 2). For instance, upper die plate 16 and die 42 have air passages 140 therethrough which are angled and cooperate with similar air passages 144 in recess 40 to apply air pressure laterally to a disk 11 which has been die-cut by die 42 so that the disk will move into the open end 146 of chute 44 (FIG. 2) and through the chute which is tubular, past a flexible guide vane 148, downwardly along a tubular, inclined portion 150, into a horizontal tubular part 152 (FIG. 1a) and then into overlying relationship to shaft 46 wherein the shaft impales the disk and the disk falls by gravity onto to stack 18 supported on a platform 154, forming part of chute 44. The stack of disks can be removed and taken to a place where the disks are further processed.

FIG. 1a shows a pair of air hoses 160 leading to upper die plate 16 from valves associated with timing cams 138 (FIG. 3). Other air hoses are provided to supply air to the air holes 144 of recess 40 (FIG. 2).

In operation, assuming upper die plate is in its operative position as shown in FIGS. 1a and 4a, strip 12 is fed into and through the apparatus until the strip is between pressure rollers 24 and 26 (FIG. 1a). Then, the apparatus is actuated when a signal is received by coil member 58 to magnetically attract core 64 (FIG. 2a), causing upper die plate 16 to move downwardly so that die 42 thereof will die-cut strip 12 to form a disk 11. Immediately after the die-cutting step, the timing means defined by timing cams 138 (FIG. 3) will deactuate the power means 56 (FIG. 2a), removing the magnetic force from core 54, causing spring 69 to return upper die plate 16 to its initial operative, elevated position. Simultaneously, with the beginning of the upward movement of the die plate, air will be forced into and through passages 140 (FIG. 6) and 144 (FIG. 2), causing air to be blown onto the die-cut disk and to cause the disk to move laterally into the chute 44 where it gravitates downwardly onto shaft 46 to form a part of stack 18.

Also, as upper die plate 16 is elevated, the timing means actuates the drive motor coupled to shaft 120 (FIG. 3), causing rack 124 to be elevated and then lowered to rotate shaft 126 coupled with lower pressure roller 26, causing the roller 26 and roller 24 thereabove to advance strip 12 in a forward direction by a distance determined by the setting of the device 26 coupling the lower end of rack 124 to shaft 120. As this occurs, the next portion of strip 12 to be die-cut is advanced into a position beneath the die 42 and the next die-cutting step is initiated, either by a foot actuated switch or automatically, depending upon whichever is desired or deemed necessary.

Apparatus 10 therefore provides a unique means for die-cutting disks of sheet material in a highly efficient and economic manner to thereby provide a large disk yield at minimum cost. Also, the apparatus is sufficiently compact in size and shape that it can fit in a minimum of space and can be operated from conventional power means. Moreover, the fact that the upper die plate can be mounted in place above lower die plate 17 by latches 80, allows the upper die plate to be quickly and easily removed from the apparatus in the event that the die 42 thereon is to be sharpened or replaced. The apparatus is suitable for die-cutting disks of Mylar which have diameters of 5¼ inches, 8 inches and 14 inches.

I claim:

1. Apparatus for die-cutting articles from sheet material comprising:

a support having an upper end;

a lower die plate mounted on the support near the upper end thereof;

an upper die plate having a die thereon and guide means for shiftably mounting the upper die plate on the support for vertical movement toward and away from the lower die plate, said upper die plate normally being spaced above the lower die plate to present a path between the die plates for a strip of sheet material movable relative to the support;

quick release latch means carried by the support for engaging and removably holding the upper die plate on the support, said latch means including a shock absorber for damping the vibrations of the upper die plate;

means coupled with the upper die plate for biasing the same upwardly relative to said support;

magnetically actuated means coupled with the upper die plate for shifting the same downwardly relative to the support to die-cut the strip of material between the die plates to form an article;

fluid pressure means coupled with the die plates for causing a die-cut article to be urged transversely of said path and away from the die when the upper die plate is shifted upwardly relative to the lower die plate;

chute means coupled with the support for receiving the articles; and control means carried by the support for controlling the operation of the shifting means, the advancing means and the causing means.

2. Apparatus for die-cutting articles from sheet material comprising:

a support having an upper end;

a lower die plate mounted on the support near the upper end thereof;

an upper die plate having a die thereon and means for shiftably mounting the upper die plate on the support for vertical movement toward and away from the lower die plate, said upper die plate normally being spaced above the lower die plate to present a path between the die plates for a strip of sheet material movable relative to the support;

means carried by the support for incrementally advancing the strip along said path;

means coupled with the upper die plate for shifting the same downwardly to cause the die thereon to die-cut the strip of material between the die plates to form an article;

means coupled to the upper die plate for biasing the same upwardly;

means coupled with at least one of the die plates for causing a die-cut article to be urged away from the die when the upper die plate is shifted upwardly relative to the lower die plate;

means coupled with said shifting means, said advancing means and said causing means for sequentially controlling the operation of the same; and quick release latch means coupled with the upper die plate and the support for removably securing the upper die plate on the support, said latch means including a latch post swingably mounted on the support and a shock absorber on the latch post, said shock absorber including a pin for engaging the upper die plate, said pin being vertically shiftable to damp the vibrations of the upper die plate due to the upward movement of the die plate away from the lower die plate.

3. Apparatus for die-cutting articles from sheet material comprising:

a support having an upper end;

a lower die plate mounted on the support near the upper end thereof;

an upper die plate having a die thereon and means for shiftably mounting the upper die plate on the support for vertical movement toward and away from the lower die plate, said upper die plate normally being spaced above the lower die plate to present a path between the die plates for a strip of sheet material movable relative to the support;

means carried by the support for incrementally advancing the strip along said path;

means coupled with the upper die plate for shifting the same downwardly to cause the die thereon to die-cut the strip of material between the die plate to form an article;

quick release latch means coupled with the upper die plate and the support for removably securing the upper die plate on the support;

means coupled to the upper die plate for biasing the same upwardly, there being shock absorbing means for damping the vibrations of the upper die plate due to upward movement of the upper die plate under the influence of said bias means;

means coupled with at least one of the die plates for causing a die-cut article to be urged away from the die when the upper die plate is shifted upwardly relative to the lower die plate; and means coupled with said shifting means, said advancing means and said causing means for sequentially controlling the operation of the same.

4. Apparatus as set forth in claim 3, wherein said latch means includes at least a latch post swingably mounted on the support, said shock absorbing means including on the latch post a spring biased pin means for engaging the upper die plate.

5. Apparatus as set forth in claim 3, wherein said mounting means includes a guide on the support and extending upwardly from the upper end thereof, said upper die plate having a follower member coupled with the guide for vertical guide movement with respect thereto.

6. Apparatus as set forth in claim 5, wherein the guide includes a tubular element, said follower member being telescopically coupled with the tubular element.

7. Apparatus as set forth in claim 3, wherein said advancing means includes a pair of adjacent pressure rollers, and means for driving one of the rollers when the strip is between and in frictional engagement with the rollers.

8. Apparatus as set forth in claim 7, wherein said drive means has an adjustable stroke.

9. Apparatus as set forth in claim 7, wherein said drive means includes a drive motor having a drive shaft, a reciprocal rack adjustably coupled at one end thereof to said drive shaft of the drive motor, and a worm mounted on the pressure roller, whereby rotation of the drive shaft of the drive motor will reciprocate the rack which in turn will rotate the worm to cause rotation of said one pressure roller to thereby advance the strip past the die plates incrementally.

10. Apparatus for die-cutting articles from sheet material comprising:

a support having an upper end;

a lower die plate mounted on the support near the upper end thereof;

an upper die plate having a die thereon and means for shiftably mounting the upper die plate on the support for vertical movement toward and away from the lower die plate, said upper die plate normally being spaced above the lower die plate to present a path between the die plates for a strip of sheet material movable relative to the support;

means carried by the support for incrementally advancing the strip along said path;

means coupled with the upper die plate for shifting the same downwardly to cause the die thereon to die-cut the strip of material between the die plate to form an article;

means coupled to the upper die plate for biasing the same upwardly, there being shock abosrbing means for damping the vibrations of the upper die plate due to upward movement of the upper die plate under the influence of said bias means;

means coupled with at least one of the die plates for causing a die-cut article to be urged away from the die when the upper die plate is shifted upwardly relative to the lower die plate, said causing means including a source of fluid under pressure, said die plates having fluid passages coupled with said fluid source, said passages being oriented to direct the article transversely of said path of the strip;

chute means coupled with said support and having an entrance adjacent to said zone at which an article is die-cut to receive the article; and means coupled with said shifting means, said advancing means and said causing means for sequentially controlling the operation of the same.

11. Apparatus for die-cutting articles from sheet material comprising:

a support having an upper end;

a lower die plate mounted on the support near the upper end thereof;

an upper die plate having a die thereon and means for shiftably mounting the upper die plate on the support for vertical movement toward and away from the lower die plate, said upper die plate normally being spaced above the lower die plate to present a path between the die plates for a strip of sheet material movable relative to the support;

means carried by the support for incrementally advancing the strip along said path;

means coupled with the upper die plate for shifting the same downwardly to cause the die thereon to die-cut the strip of material between the die plate to form an article;

means coupled to the upper die plate for biasing the same upwardly, there being shock absorbing means for damping the vibrations of the upper die plate due to upward movement of the upper die plate under the influence of said bias means;

means coupled with at least one of the die plates for causing a die-cut article to be urged away from the die when the upper die plate is shifted upwardly relative to the lower die plate;

chute means coupled with said support and having an entrance adjacent to said zone at which an article is die-cut, said chute means including a conduit extending laterally from said lower die plate and having a vertical receptacle for receiving the articles in a stack; and means coupled with said shifting means, said advancing means and said causing means for sequentially controlling the operation of the same.

12. Apparatus for die-cutting articles from sheet material comprising:

a support having an upper end;

a lower die plate mounted on the support near the upper end thereof;

an upper die plate having a die thereon and means for shiftably mounting the upper die plate on the support for vertical movement toward and away from the lower die plate, said upper die plate normally being spaced above the lower die plate to present a path between the die plates for a strip of sheet material movable relative to the support;

means carried by the support for incrementally advancing the strip along said path;

means coupled with the upper die plate for shifting the same downwardly to cause the die thereon to die-cut the strip of material between the die plate to form an article, said shifting means including a coil member having a central recess provided with an open top, said coil member being on the upper end of the support, and a core of magnetic material movable downwardly into said recess, said core being on said upper die plate, said core being attracted into the recess by a magnetic force generated by the coil member when a current flows therethrough;

means coupled to the upper die plate for biasing the same upwardly, there being shock absorbing means for damping the vibrations of the upper die plate due to upward movement of the upper die plate under the influence of said bias means, said bias means including a pin projecting downwardly from said core member and engageable with a lower inner surface of the coil member, and a spring for biasing the pin downwardly to thereby bias the upper die plate upwardly relative to said lower die plate;

means coupled with at least one of the die plates for causing a die-cut article to be urged away from the die when the upper die plate is shifted upwardly relative to the lower die plate; and means coupled with said shifting means, said advancing means and said causing means for sequentially controlling the operation of the same.

* * * * *